(12) United States Patent
Xu et al.

(10) Patent No.: US 11,319,636 B2
(45) Date of Patent: May 3, 2022

(54) METHOD FOR PREPARING AN ORDERED POROUS CARBON MATERIAL WITH INEXPENSIVE CARBON BLACK, ORDERED POROUS CARBON MATERIAL AND USE THEREOF

(71) Applicant: Changchun Institute of Applied Chemistry, Chinese Academy of Sciences, Jilin Province (CN)

(72) Inventors: Weilin Xu, Jilin Province (CN); Fa Yang, Jilin Province (CN); Yipiao Bi, Jilin Province (CN); Mingbo Ruan, Jilin Province (CN); Ping Song, Jilin Province (CN)

(73) Assignee: Changchun Institute of Applied Chemistry, Chinese Academy of Sciences, Jilin Province (CN)

( * ) Notice: Subject to any disclaimer, the term of this patent is extended or adjusted under 35 U.S.C. 154(b) by 137 days.

(21) Appl. No.: 16/408,951

(22) Filed: May 10, 2019

(65) Prior Publication Data

US 2020/0190678 A1    Jun. 18, 2020

(30) Foreign Application Priority Data

Dec. 14, 2018   (CN) .......................... 201811536510.5

(51) Int. Cl.
```
C01B 31/02      (2006.01)
C25B 11/043     (2021.01)
C25B 1/00       (2021.01)
C25B 3/25       (2021.01)
C25B 11/031     (2021.01)
C01B 32/05      (2017.01)
```
(52) U.S. Cl.
CPC ............ *C25B 11/043* (2021.01); *C01B 32/05* (2017.08); *C25B 1/00* (2013.01); *C25B 3/25* (2021.01); *C25B 11/031* (2021.01)

(58) Field of Classification Search
CPC ...................................................... C01B 32/05
See application file for complete search history.

(56) References Cited

U.S. PATENT DOCUMENTS 10,326,142 B2 *   6/2019  Wu .................. H01M 10/4235

FOREIGN PATENT DOCUMENTS

| CN | 105244513 A  | 1/2016 |
| JP | 2008/123860 A | 5/2008 |

OTHER PUBLICATIONS

Office Action issued in corresponding Japanese Application No. 2019-112,485 dated Apr. 7, 2020.

* cited by examiner

*Primary Examiner* — Stuart L Hendrickson
(74) *Attorney, Agent, or Firm* — Cesari & McKenna, LLP

(57) ABSTRACT

The present disclosure relates to a method for preparing an ordered porous carbon materials with inexpensive carbon black. The method comprises: dispersing carbon black into a concentrated nitric acid to obtain a uniform dispersion; placing the dispersion in a reactor to perform a reaction by a one-step hydrothermal process; and washing and drying the reaction mixture to obtain an ordered porous carbon material in a honeycomb-like arrangement and rich in oxygen defects. The present disclosure also relates to an ordered porous carbon material prepared by the method, a method for electrocatalytically reducing carbon dioxide to formic acid under ambient temperature and atmospheric pressure by using the ordered porous carbon material, and a method for electrocatalytically reducing nitrogen to ammonia under ambient temperature and atmospheric pressure by using the ordered porous carbon material as a supported catalyst.

6 Claims, 5 Drawing Sheets

METHOD FOR PREPARING AN ORDERED POROUS CARBON MATERIAL WITH INEXPENSIVE CARBON BLACK, ORDERED POROUS CARBON MATERIAL AND USE THEREOF

CROSS REFERENCE TO RELATED APPLICATION

The present application claims a priority benefit of Chinese Patent Application No. 201811536510.5, filed on Dec. 14, 2018, the entire contents of which is incorporated herein by reference.

TECHNICAL FIELD

The present disclosure relates to the technical field of preparing carbon materials, in particular to a method for preparing an ordered porous carbon material with inexpensive carbon black, an ordered porous carbon material and use thereof.

BACKGROUND

Porous carbon materials are widely used in applications such as harmful gas and pollutant adsorption and gas storage and separation in daily life and catalysis industry, due to their pore-rich structure, large specific surface area and high chemical stability. They are also widely used as catalyst supports in applications in the fields of chemical industry, energy storage, and catalysis. Known porous carbon materials mainly comprise activated carbon (AC), activated carbon fiber (ACF), carbon molecular sieve (CMS), carbon nanotubes (CNTs) and graphene oxide (GO). To date, porous carbon materials are mostly obtained through an activation process. Among them, disordered porous carbon material can be prepared by a hard mold method, a soft mold method, a dual-mold method, and the like, but their pore structures are often closed blind holes. Ordered porous carbon materials are mainly obtained by using molecular sieves as template agent. For example, modulatable ordered mesoporous carbon materials are mainly synthesized by using mesoporous silicon material MCM-48 or SBA-15 as template agent, and ordered mesoporous carbon materials having a graphite structure can be obtained by converting carbon sources having a flexible structure into graphite materials having a highly ordered structure at high temperature. These microporous, mesoporous and macroporous materials exhibit different functions in specific applications. For example, in the field of catalytic cells, macropores are mainly used to store electrolyte solutions, mesopores are used to conduct electrolytes, and micropores are used to provide a site for double electric layer reaction. However, in most cases, those pores cannot be communicated with each other to perform their intended functions.

Although syntheses of porous carbon materials have achieved great success in the past few years, there are still some technical problems to be solved. At present, rising methods including metal catalytic activation, organic aerogel carbonization and template synthesis using silicon nanoparticles can solve the above blind hole problem well. However, all the above methods are physical activation methods with cumbersome preparation process and long preparation period, and the expensive template agent cannot be reused and is not suitable for large-scale production, thereby greatly limiting preparation and commercial application of porous carbon materials. Furthermore, although ordered pore structure can be formed by adding a template agent during carbon formation, carbon materials prepared by these methods tend to have a low graphitization degree, and the electrical conductivity and stability thereof are much worse than those of ordinary carbons. Therefore, in order to exploit applications of porous carbon materials in different fields, there is a need to develop a simple and practical method for preparing porous carbon materials.

SUMMARY

In order to solve the technical problems in prior art, the present disclosure provides a method for preparing an ordered porous carbon material with inexpensive carbon black, an ordered porous carbon material and use thereof. In the present disclosure, a uniformly distributed ordered porous carbon material is prepared by a simple one-step hydrothermal process, and raw materials are inexpensive and easily available, thereby greatly reducing production cost and facilitating large-scale industrial applications.

In order to solve the above technical problem, the present disclosure provides a method for preparing an ordered porous carbon material with inexpensive carbon black, comprising the steps of:

dispersing carbon black into a concentrated nitric acid to obtain a uniform dispersion;

placing the dispersion in a reactor to perform a reaction by a one-step hydrothermal process; and washing and drying the reaction mixture to obtain an ordered porous carbon material in a honeycomb-like arrangement and rich in oxygen defects.

In some embodiments, the concentration of the concentrated nitric acid is 45% to 65% by mass.

In some embodiments, the reaction is performed at a temperature of from 120 to 160° C. for 4 to 8 hours.

In some embodiments, the reaction is performed at a temperature of from 120 to 150° C. for 5 to 6 hours.

In some embodiments, said washing and drying the reaction mixture comprises adding water to the reaction mixture, and then subjecting the mixture to rotary evaporation and centrifugation.

In some embodiments, said washing and drying are repeated for 3 to 5 times.

In some embodiments, the carbon black is BP-2000, XC-72, N220, N330, N550, N660, N990, N110, N115, N234, N326, N339, N375, N539, N550, or N880.

In some embodiments, the amount of the concentrated nitric acid used is 80 to 100 mL with respect to 1 g of the carbon black.

In some embodiments, the ordered porous carbon material prepared has a thickness of 3 nm to 8 nm and an oxidation degree of 1.993 to 2.012.

In some embodiments, the ordered porous carbon material prepared has a thickness of 3 nm and an oxidation degree of 2.012.

The present disclosure also provides an ordered porous carbon material prepared by the method as described above, wherein the ordered porous carbon material is in a honeycomb-like arrangement and rich in oxygen defects, and has an oxidation degree of 1.993 to 2.012.

The present disclosure also provides a method for electrocatalytically reducing carbon dioxide to formic acid under ambient temperature and atmospheric pressure, comprising preparing a working electrode by using the ordered porous carbon material as described above.

In some embodiments, the method for electrocatalytically reducing carbon dioxide to formic acid under ambient temperature and atmospheric pressure comprises:

preparing a three-electrode electrolytic cell separated by a proton exchange membrane, wherein a working electrode is prepared by mixing and sonicating the ordered porous carbon material, ethanol, and a Nafion solution to obtain a dispersion, and uniformly applying the dispersion onto a carbon paper; a platinum plate is used as a counter electrode; and a saturated calomel electrode is used as a reference electrode;

charging an electrolyte solution into a cathode chamber and an anode chamber respectively, and introducing $CO_2$ to saturation; and potentiostatically reducing $CO_2$ with continuously introducing $CO_2$, wherein the potential during potentiostatic reduction is controlled in a range of −0.38 V to −0.98 V vs. Reversible Hydrogen Electrode (RHE), the time for reduction is 4 to 6 h, and the electrolyte solution is a $NaHCO_3$, $KHCO_3$ or $Na_2SO_4$ solution.

The present disclosure also provides a method for electrocatalytically reducing nitrogen to ammonia under ambient temperature and atmospheric pressure in the presence of a supported catalyst prepared by using the ordered porous carbon material as described above.

In some embodiments, the method for electrocatalytically reducing nitrogen to ammonia under ambient temperature and atmospheric pressure comprises:

preparing the supported catalyst by adding ferric chloride and the ordered porous carbon material in distilled water, mixing them by sonication, then drying the mixture by rotary evaporation, placing the dried mixture in a tube furnace, and pyrolyzing the mixture under a nitrogen atmosphere;

preparing a three-electrode electrolytic cell separated by a proton exchange membrane, wherein a working electrode is prepared by mixing and sonicating the prepared supported catalyst, ethanol, and a Nafion solution to obtain a dispersion, and uniformly applying the dispersion onto a carbon paper; a platinum plate is used as a counter electrode; and a saturated calomel electrode is used as a reference electrode;

charging an electrolyte solution into a cathode chamber and an anode chamber respectively and introducing $N_2$ to saturation; and potentiostatically reducing $N_2$ with continuously introducing $N_2$, wherein the potential during potentiostatic reduction is controlled in a range of −0.45 V to −0.85 V vs. RHE, the time for reduction is 2 to 4 h, and the electrolyte solution is a $H_2SO_4$ solution.

The present disclosure has the following advantageous effects.

(1) Template methods are used in most methods for preparing porous carbon materials in prior art, where the preparation process is complicated, the preparation period is long, and the raw materials cannot be reused. It is rarely reported that carbon-based materials themselves can form an ordered porous structure without template agent and auxiliary agent. In the present disclosure a uniformly distributed and honeycomb-like ordered porous carbon material is firstly prepared with inexpensive carbon black as raw material by a simple one-step hydrothermal process.

(2) The ordered porous carbon material prepared by the preparation method provided in the present disclosure has a thickness of only 3 to 8 nm, comprises plenty of pore structures and oxygen-containing functional groups (mainly carboxyl groups), and exhibits excellent solubility in both aqueous phase and organic phase and good electrical conductivity. It becomes possible to use the ordered porous carbon material in the fields of material catalysis and polymer modification. At the same time, the porous material exhibits good properties in electrocatalytic reduction of $CO_2$ into formic acid, and exhibits excellent properties in electrocatalytic reduction of nitrogen into ammonia as a supported catalyst.

(3) In the preparation method provided in the present disclosure, the raw materials are inexpensive and easily available, and the process is simple, thereby greatly reducing production cost and facilitating large-scale industrial application.

BRIEF DESCRIPTION OF THE DRAWINGS

The present disclosure will be further explained in detail below with reference to the drawings and particular embodiments.

DESCRIPTION OF EMBODIMENTS

Figure 1:
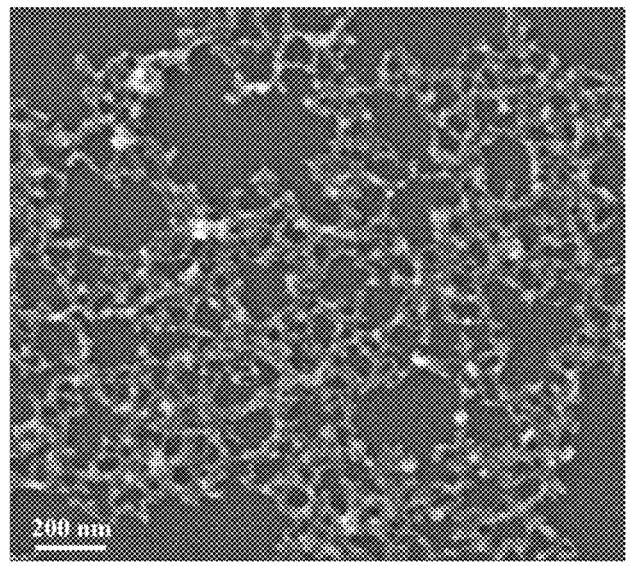
FIG. 1 is a Scanning Electron Micrograph of the porous carbon material prepared in Example 1 of the present disclosure.

The present disclosure provides a method for preparing an ordered porous carbon material with inexpensive carbon black, comprising:

dispersing carbon black into a concentrated nitric acid to obtain a uniform dispersion;

placing the dispersion in a reactor to perform a reaction by a one-step hydrothermal process; and washing and drying the reaction mixture to obtain an ordered porous carbon material in a honeycomb-like arrangement and rich in oxygen defects.

Preferably, the concentration of the concentrated nitric acid is 45% to 65% by mass.

Preferably, the reaction is performed at a temperature of from 120 to 160° C. for 4 to 8 hours.

More preferably, the reaction is performed at a temperature of from 120 to 150° C. for 5 to 6 hours.

Preferably, said washing and drying the reaction mixture comprises adding water to the reaction mixture, and then subjecting the mixture to rotary evaporation and centrifugation.

Preferably, said washing and drying are repeated for 3 to 5 times.

Any commonly used carbon black in the art may be used in the method provided in the present disclosure. For example, carbon black of type BP-2000, XC-72, N220, N330, N550, N660, N990, N110, N115, N234, N326, N339, N375, N539, N550, or N880 may be used. Carbon black of type BP-2000 or XC-72 is most preferable.

Preferably, the amount of the concentrated nitric acid used is 80 to 100 mL with respect to 1 g of the carbon black.

Preferably, the ordered porous carbon material prepared has a thickness of 3 nm to 8 nm and an oxidation degree of 1.993 to 2.012. More preferably, the ordered porous carbon material prepared has a thickness of 3 nm and an oxidation degree of 2.012.

The present disclosure also provides an ordered porous carbon material prepared by the method as described above, wherein the ordered porous carbon material is in a honeycomb-like arrangement and rich in oxygen defects, and has an oxidation degree of 1.993 to 2.012.

The present disclosure also provides a method for electrocatalytically reducing carbon dioxide to formic acid under ambient temperature and atmospheric pressure, comprising preparing a working electrode by using the ordered porous carbon material as described above.

Preferably, the method for electrocatalytically reducing carbon dioxide to formic acid under ambient temperature and atmospheric pressure comprises:

preparing a three-electrode electrolytic cell separated by a proton exchange membrane, wherein a working electrode is prepared by mixing and sonicating the ordered porous carbon material, ethanol, and a Nafion solution to obtain a dispersion, and uniformly applying the dispersion onto a carbon paper; a platinum plate is used as a counter electrode; and a saturated calomel electrode is used as a reference electrode;

charging an electrolyte solution into a cathode chamber and an anode chamber respectively, and introducing $CO_2$ to saturation; and potentiostatically reducing $CO_2$ with continuously introducing $CO_2$, wherein the potential during potentiostatic reduction is controlled in a range of −0.38 V to −0.98 V vs. Reversible Hydrogen Electrode (RHE), the time for reduction is 4 to 6 h, and the electrolyte solution is a $NaHCO_3$, $KHCO_3$ or $Na_2SO_4$ solution.

The present disclosure also provides a method for electrocatalytically reducing nitrogen to ammonia under ambient temperature and atmospheric pressure in the presence of a supported catalyst prepared by using the ordered porous carbon material as described above.

Preferably, the method for electrocatalytically reducing nitrogen to ammonia under ambient temperature and atmospheric pressure comprises:

preparing the supported catalyst by adding ferric chloride and the ordered porous carbon material in distilled water, mixing them by sonication, then drying the mixture by rotary evaporation, placing the dried mixture in a tube furnace, and pyrolyzing the mixture under a nitrogen atmosphere;

preparing a three-electrode electrolytic cell separated by a proton exchange membrane, wherein a working electrode is prepared by mixing and sonicating the prepared supported catalyst, ethanol, and a Nafion solution to obtain a dispersion, and uniformly applying the dispersion onto a carbon paper; a platinum plate is used as a counter electrode; and a saturated calomel electrode is used as a reference electrode;

charging an electrolyte solution into a cathode chamber and an anode chamber respectively and introducing $N_2$ to saturation; and potentiostatically reducing $N_2$ with continuously introducing $N_2$, wherein the potential during potentiostatic reduction is controlled in a range of −0.45 V to −0.85 V vs. RHE, the time for reduction is 2 to 4 h, and the electrolyte solution is a $H_2SO_4$ solution.

The present disclosure will be explained in detail below with reference to the drawings.

EXAMPLE 1

Preparation of a Porous Carbon Material Having a Thickness of 3 nm 1 g of carbon black BP-2000 was added into 100 mL of concentrated nitric acid with a concentration of 65% by mass. The mixture was sonicated with stirring for 1 hour until a uniformly dispersed solution was formed. Then, the solution was placed in a hydrothermal reactor and reacted at 150° C. for 5 hours. After the reactor was cooled to ambient temperature, the resultant was washed with distilled water and dried through rotary evaporation and centrifugation for 3-5 times, to obtain an ordered porous carbon material having a thickness of 3 nm and an oxidation degree (g value) of 2.012.

FIG. 1 is a Scanning Electron Micrograph of the porous carbon material prepared in Example 1 of the present disclosure. As can be seen from this figure, the pore structure of the porous carbon material prepared in Example 1 is in a honeycomb-like arrangement.

Figure 2:
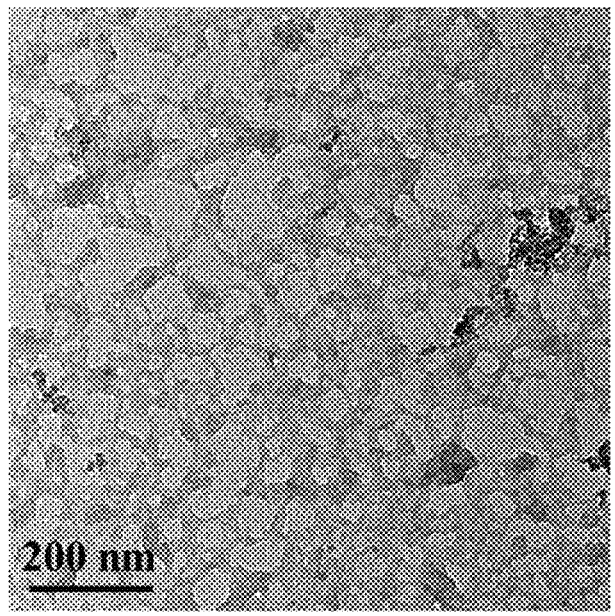
FIG. 2 is a Transmission Electron Micrograph of the porous carbon material prepared in Example 1 of the present disclosure.

FIG. 2 is a Transmission Electron Micrograph of the porous carbon material prepared in Example 1 of the present disclosure. As can be seen from this figure, the porous carbon material prepared in Example 1 has a pore-rich structure, and is uniformly distributed and structurally ordered.

Figure 3:
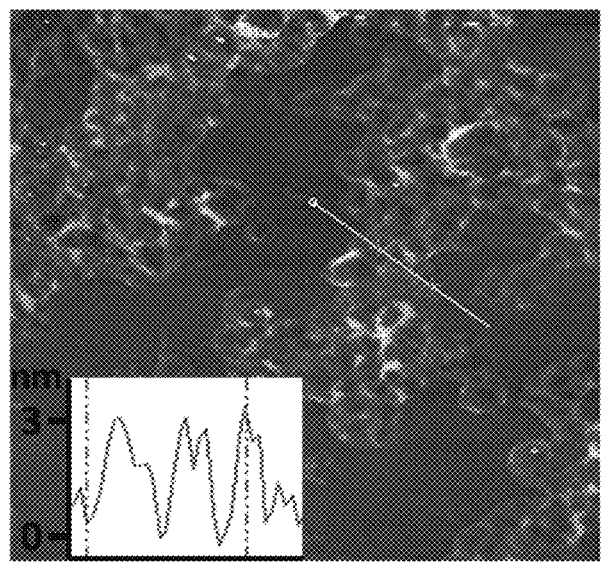
FIG. 3 is an Atomic Force Micrograph of the porous carbon material prepared in Example 1 of the present disclosure.

FIG. 3 is an Atomic Force Micrograph of the porous carbon material prepared in Example 1 of the present disclosure. As can be seen from this figure, the average thickness of the material is 3 nm.

Figure 4:
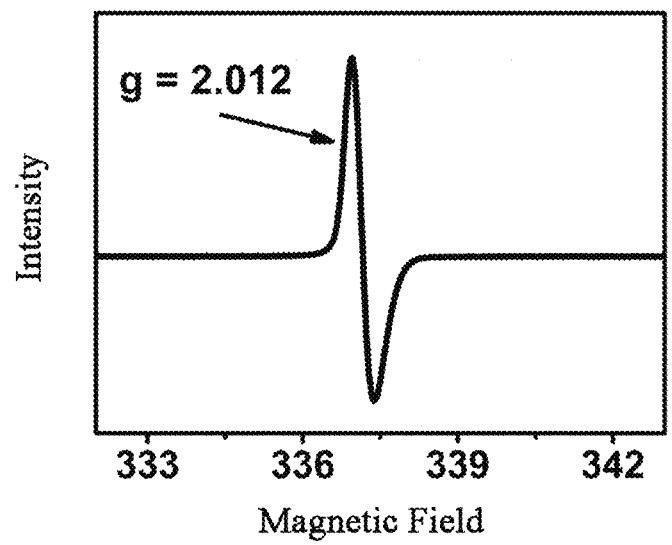
FIG. 4 is an Electron Paramagnetic Resonance spectrum of the porous carbon material prepared in Example 1 of the present disclosure.

FIG. 4 is an Electron Paramagnetic Resonance spectrum of the porous carbon material prepared in Example 1 of the present disclosure. As can be seen from this figure, the porous carbon material prepared by the present method has a very high oxidation degree, where the g value for oxidation is up to 2.012.

Figure 5:
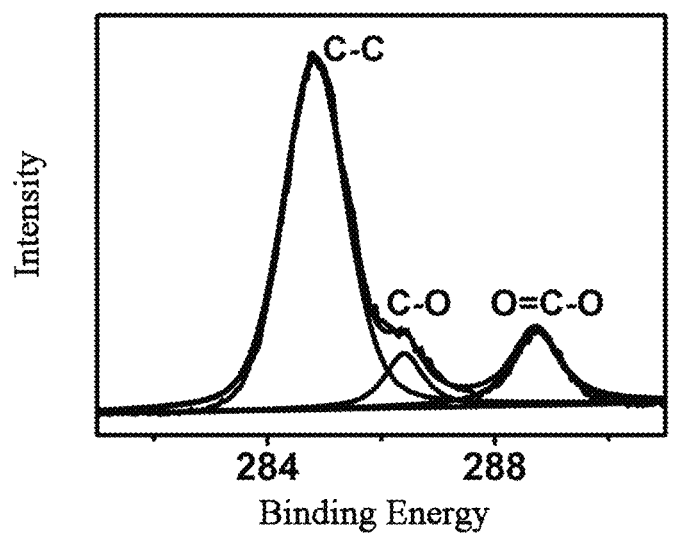
FIG. 5 is a High Resolution X-ray Photoelectron Spectrum of the porous carbon material prepared in Example 1 of the present disclosure.

FIG. 5 is a High Resolution X-ray Photoelectron Spectrum of the porous carbon material prepared in Example 1 of the present disclosure. As can be seen from this figure, the porous carbon material prepared by the method of the present disclosure comprises plenty of oxygen-containing functional groups, in which the proportion of carboxyl group is the highest.

Figure 6:
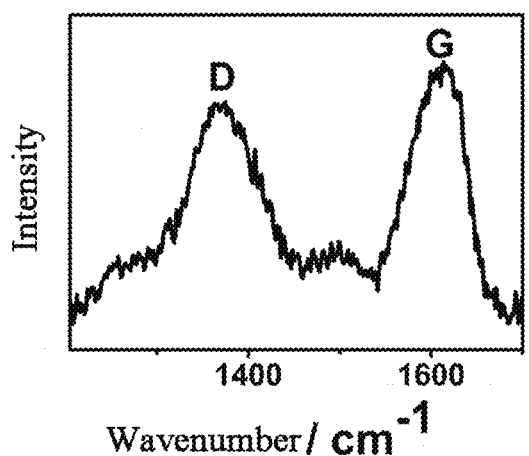
FIG. 6 is a Raman spectrum of the porous carbon material prepared in Example 1 of the present disclosure.

FIG. 6 is a Raman spectrum of the porous carbon material prepared in Example 1 of the present disclosure. As can be seen from this figure, the porous carbon material prepared by the method of the present disclosure has a very high defect degree.

EXAMPLE 2

Preparation of a Porous Carbon Material Having a Thickness of 8 nm 1 g of carbon black XC-72 was added into 100 mL of concentrated nitric acid with a concentration of 45% by mass. The mixture was sonicated with stirring for 1 hour until a uniformly dispersed solution was formed. Then, the solution was placed in a hydrothermal reactor and reacted at 120° C. for 6 hours. After the reactor was cooled to ambient temperature, the resultant was washed with distilled water and dried through rotary evaporation and centrifugation for 3-5 times, to obtain an ordered porous carbon material having a thickness of 8 nm and an oxidation degree (g value) of 2.005.

The carbon material prepared in this example is a uniformly distributed and honeycomb-like ordered porous carbon material. The carbon material can be used in electrocatalytic reduction of $CO_2$ into formic acid, and used as a supported catalyst in electrocatalytic reduction of nitrogen into ammonia.

Figure 11:
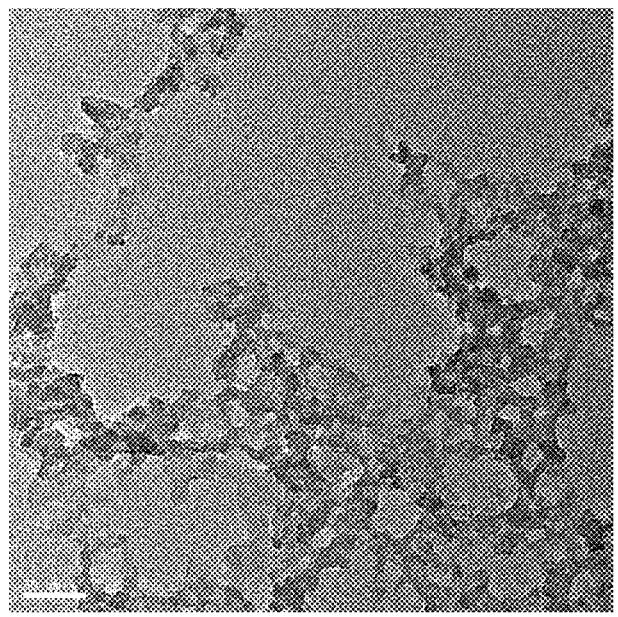
FIG. 11 is a Transmission Electron Micrograph of the porous carbon material prepared in Example 2 of the present disclosure.

FIG. 11 is a Transmission Electron Micrograph of the porous carbon material prepared by using XC-72 as raw material in the present disclosure. This figure demonstrates that the porous carbon material having a pore-rich structure can also be obtained by treating XC-72 in the method of the present disclosure.

EXAMPLE 3

The method for electrocatalytically reducing nitrogen into ammonia in the presence of the porous carbon material comprises the steps as follows. 7.8 mg ferric chloride and 100 mg of the ordered porous carbon material were added into distilled water, and mixed by sonication for 30 min. Then, the mixture was dried through rotary evaporation. The dried mixture was placed in a tube furnace and pyrolyzed at 900° C. under a nitrogen atmosphere for 1 hour to obtain a supported catalyst. Subsequently, a three-electrode electrolytic cell separated by a proton exchange membrane was prepared, wherein a working electrode was prepared by mixing and sonicating the supported catalyst obtained, ethanol, and a Nafion solution to obtain a dispersion, and uniformly applying the dispersion onto a carbon paper; a platinum plate was used as a counter electrode; and a saturated calomel electrode was used as a reference electrode. An electrolyte solution was charged into a cathode chamber and an anode chamber respectively, and $N_2$ was introduced to saturation. Then, $N_2$ was potentiostatically reduced with continuously introducing $N_2$, wherein the potential during potentiostatic reduction was controlled in a range of −0.45 V to −0.85 V vs. RHE, and the time for electrolytic reduction was 2 h. The above electrolyte solution was a $H_2SO_4$ solution.

Figure 7:
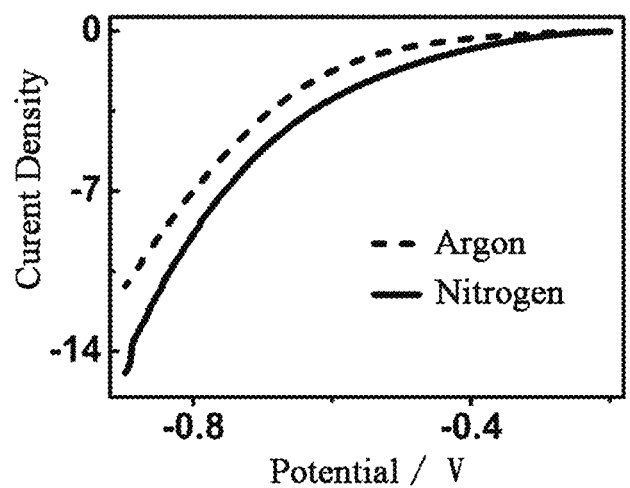
FIG. 7 is a Linear Scanning Voltammogram of reduction of $N_2$ in the presence of the porous carbon material supported catalyst prepared in Example 3 of the present disclosure.

FIG. 7 is a Linear Scanning Voltammogram of reduction of $N_2$ in a $H_2SO_4$ solution in the presence of the porous carbon material supported catalyst prepared in Example 3 of the present disclosure. As can be seen from this figure, the material has a relatively large response to $N_2$.

Figure 8:
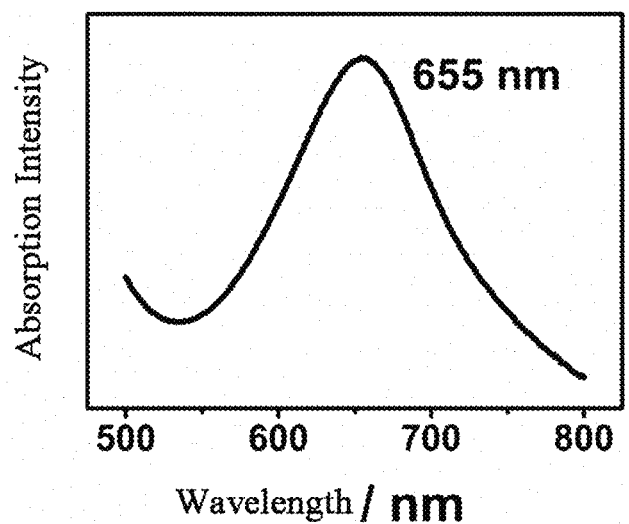
FIG. 8 is an ultraviolet absorption spectrum of reduction of $N_2$ into $NH_3$ at −0.55 V in the presence of the porous carbon material supported catalyst prepared in Example 3 of the present disclosure.

FIG. 8 is an ultraviolet absorption spectrum of reduction of $N_2$ into $NH_3$ at −0.55 V in the presence of the porous carbon material supported catalyst prepared in Example 3 of the present disclosure. This figure demonstrates that $NH_3$ is indeed detected by ultraviolet absorption spectrum.

EXAMPLE 4

The method for electrocatalytically reducing carbon dioxide into formic acid in the presence of the porous carbon material comprises the steps as follows. A three-electrode electrolytic cell separated by a proton exchange membrane was prepared, wherein a working electrode was prepared by mixing and sonicating 5 mg of the ordered porous carbon material prepared in Example 1, ethanol and, a Nafion solution to obtain a dispersion, and uniformly applying the dispersion onto a carbon paper; a platinum plate was used as a counter electrode; and a saturated calomel electrode was used as a reference electrode. An electrolyte solution was charged into a cathode chamber and an anode chamber respectively, and $CO_2$ was introduced to saturation. Then, $CO_2$ was potentiostatically reduced with continuously introducing $CO_2$, wherein the potential during potentiostatic reduction was controlled in a range of −0.38 V to −0.98 V vs. RHE, and the time for electrolytic reduction is 5 h. The above electrolyte solution is a $KHCO_3$ solution.

The above electrolyte solution may also be replaced with a $NaHCO_3$ or $Na_2SO_4$ solution. The time for electrolysis may be any time period within 4 to 6 hours.

Figure 9:
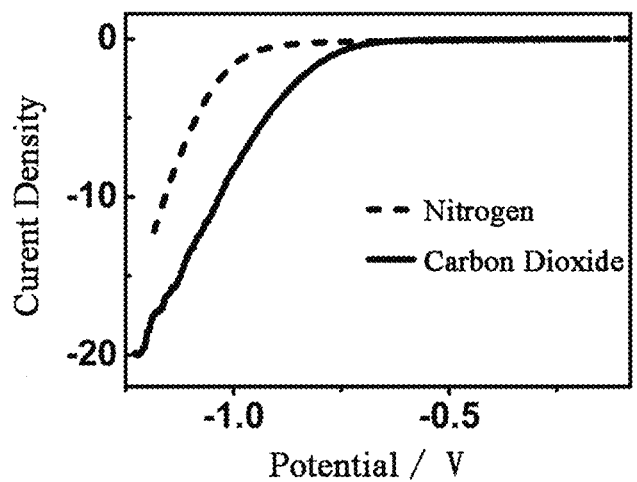
FIG. 9 is a Linear Scanning Voltammogram of reduction of $CO_2$ in the presence of the porous carbon material prepared in Example 4 of the present disclosure.

FIG. 9 is a Linear Scanning Voltammogram of reduction of $CO_2$ in a $KHCO_3$ solution in the presence of the porous carbon material prepared in Example 4 of the present disclosure. As can be seen from this figure, said material has a relatively large response to $CO_2$.

Figure 10:
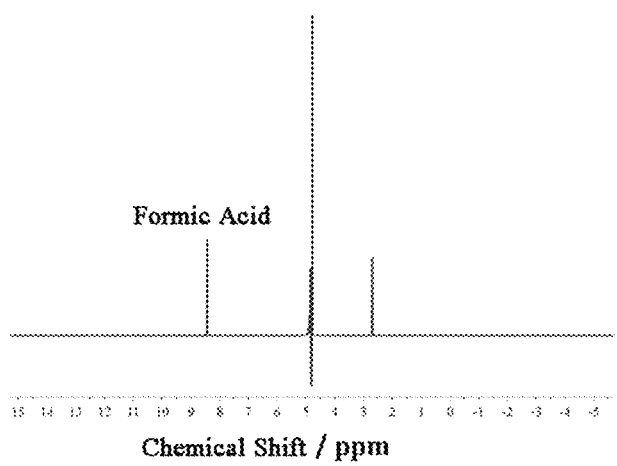
FIG. 10 is a Nuclear Magnetic Resonance spectrum of catalytic reduction of $CO_2$ into formic acid at −0.78 V in the presence of the porous carbon material prepared in Example 4 of the present disclosure.

FIG. 10 is a Nuclear Magnetic Resonance spectrum of catalytic reduction of $CO_2$ into formic acid at −0.78 V in the presence of the porous carbon material prepared in Example 4 of the present disclosure. This figure demonstrates that formic acid is indeed detected by H-Nuclear Magnetic Resonance (NMR) (AV 500).

EXAMPLE 5

Preparation of a Porous Carbon Material Having a Thickness of 6 nm 1 g of carbon black N220 was added into 80 mL of concentrated nitric acid with a concentration of 50% by mass. The mixture was sonicated with stirring for 1 hour until a uniformly dispersed solution was formed. Then, the solution was placed in a hydrothermal reactor and reacted at 130° C. for 8 hours. After the reactor was cooled to ambient temperature, the resultant was washed with distilled water and dried through rotary evaporation and centrifugation for 3 to 5 times, to obtain an ordered porous carbon material having a thickness of 6 nm and an oxidation degree (g value) of 1.993.

The carbon material prepared in this example is a uniformly distributed and honeycomb-like ordered porous carbon material. The carbon material can be used in electrocatalytic reduction of $CO_2$ into formic acid, and used as a supported catalyst in electrocatalytic reduction of nitrogen into ammonia.

EXAMPLE 6

Preparation of a Porous Carbon Material Having a Thickness of 5 nm 1 g of carbon black N660 was added into 80 mL of concentrated nitric acid with a concentration of 60% by mass. The mixture was sonicated with stirring for 1 hour until a uniformly dispersed solution was formed. Then, the solution was placed in a hydrothermal reactor and reacted at 160° C. for 4 hours. After the reactor was cooled to ambient temperature, the resultant was washed with distilled water and dried through rotary evaporation and centrifugation for 3 to 5 times, to obtain an ordered porous carbon material having a thickness of 5 nm and an oxidation degree (g value) of 1.995.

The carbon material prepared in this example is a uniformly distributed and honeycomb-like ordered porous carbon material. The carbon material can be used in electrocatalytic reduction of $CO_2$ into formic acid, and used as a supported catalyst in electrocatalytic reduction of nitrogen into ammonia.

The carbon black raw material used in the above examples may be replaced with carbon black of type N330, N550, N990, N110, N115, N234, N326, N339, N375, N539, N550, or N880. All of the above types of carbon black can be used to prepare a uniformly distributed and honeycomb-like ordered porous carbon material. And all the ordered porous carbon materials prepared can be used in electrocatalytic reduction of $CO_2$ into formic acid and used as a supported catalyst in electrocatalytic reduction of nitrogen into ammonia.

Apparently, the above examples are only intended for illustrative purpose, but not to limit the embodiments. Other variations or modifications can be made by those skilled in the art based on the above description. There is no need and no way to exhaust all embodiments. Obvious variations or modifications on the embodiments fall within the protection scope of the present invention.

What is claimed is:

1. A method for preparing a porous carbon material with carbon black, comprising:
   dispersing carbon black into a concentrated nitric acid to obtain a uniform dispersion;
   heating the dispersion at a temperature of 120 to 160° C. for 4 to 8 hours; and
   washing and drying the heated dispersion to obtain a porous carbon material containing oxygen defects.

2. The method according to claim 1, wherein the concentration of the concentrated nitric acid is 45% to 65% by mass.

3. The method according to claim 1, wherein the dispersion is heated at a temperature of 120 to 150° C. for 5 to 6 hours.

4. The method according to claim 1, wherein said washing and drying the heated dispersion comprises adding water to the heated dispersion, and then subjecting the heated dispersion to rotary evaporation and centrifugation.

5. The method according to claim 1, wherein said washing and drying are repeated for 3 to 5 times.

6. The method according to claim 1, wherein the amount of the concentrated nitric acid used is 80 to 100 mL with respect to 1 g of the carbon black.

* * * * *